May 18, 1965  A. H. WENDE  3,184,068
DISPLAY RACK FOR TORUS SHAPED ARTICLES
Filed April 4, 1962  2 Sheets-Sheet 2
FIG. 2
FIG. 3
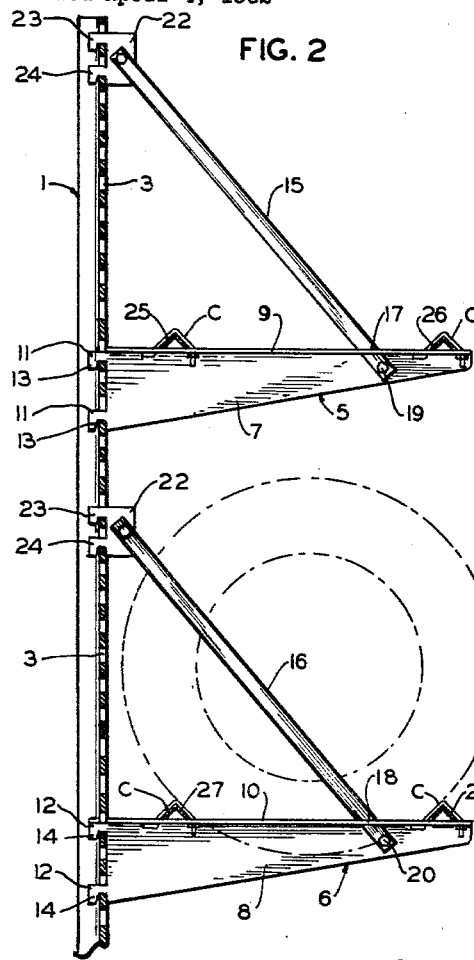
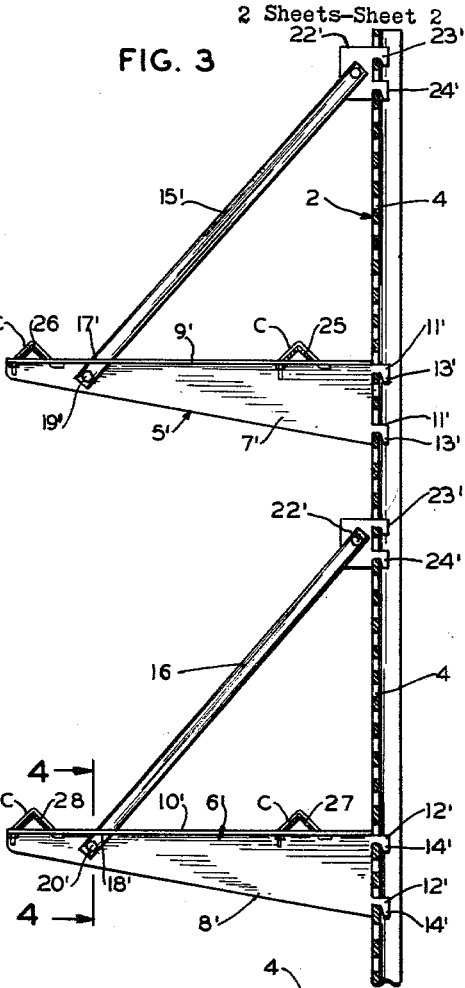
FIG. 5
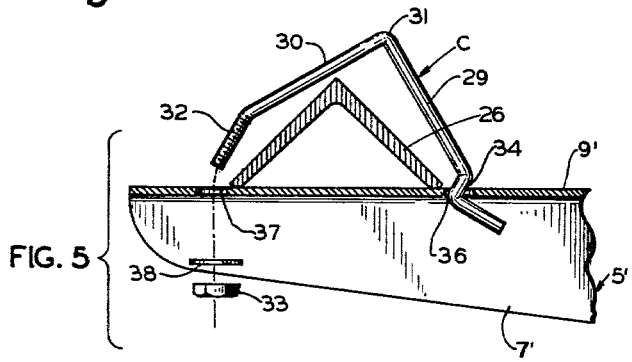
FIG. 4
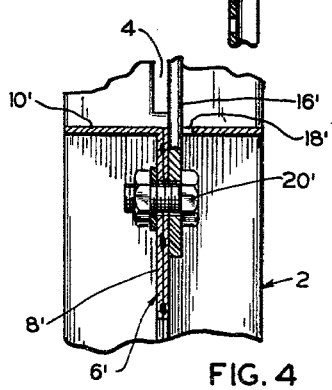
INVENTOR.
ADOLPH H. WENDE
BY
ATTORNEY United States Patent Office 3,184,068
Patented May 18, 1965

3,184,068
DISPLAY RACK FOR TORUS SHAPED ARTICLES
Adolph H. Wende, University City, Mo., assignor to Shure Manufacturing Corporation, St. Louis, Mo., a corporation of Missouri
Filed Apr. 4, 1962, Ser. No. 185,022
3 Claims. (Cl. 211—23)

This invention relates in general to certain new and useful improvements in display racks and, more particularly, to an improved assembly clamp used in assembling such fixtures.

It is the primary object of the present invention to provide a display rack which can be easily and conveniently assembled in a fast and efficient manner.

It is another object of the present invention to provide a display rack of the type stated which is sturdy in construction, light in weight, and economical to manufacture.

It is a further object of the present invention to provide a clamp for use in assembling display racks which is self-contained and simple in operation.

It is also an object of the present invention to provide a clamp of the type stated which is capable of being mass produced at low cost.

With the above and other objects in view, my invention resides in the novel features of form, construction, arrangement, and combination of parts presently described and pointed out in the claims.

In the accompanying drawings—

FIG. 1 is a perspective view of a tire display rack constructed in accordance with and embodying the present invention;

FIGS. 2 and 3 are vertical sectional views taken along lines 2—2 and 3—3, respectively, of FIG. 1;

FIG. 4 is a fragmentary sectional view taken along line 4—4 of FIG. 3;

FIG. 5 is a side elevational view of a clamp used in connection with the present invention and showing the method of assembling a portion of the tire display rack of FIG. 1;

FIG. 6 is a side elevational view of the clamp shown in FIG. 5;

FIG. 7 is a top plan view of the clamp shown in FIG. 5;

FIG. 8 is a side elevational view of a modified form of clamp used in the assembly of the tire display rack;

FIG. 9 is a top plan view of the clamp of FIG. 8; and

FIG. 10 is a left side elevational view of the clamp shown in FIG. 8.

Figure 1:
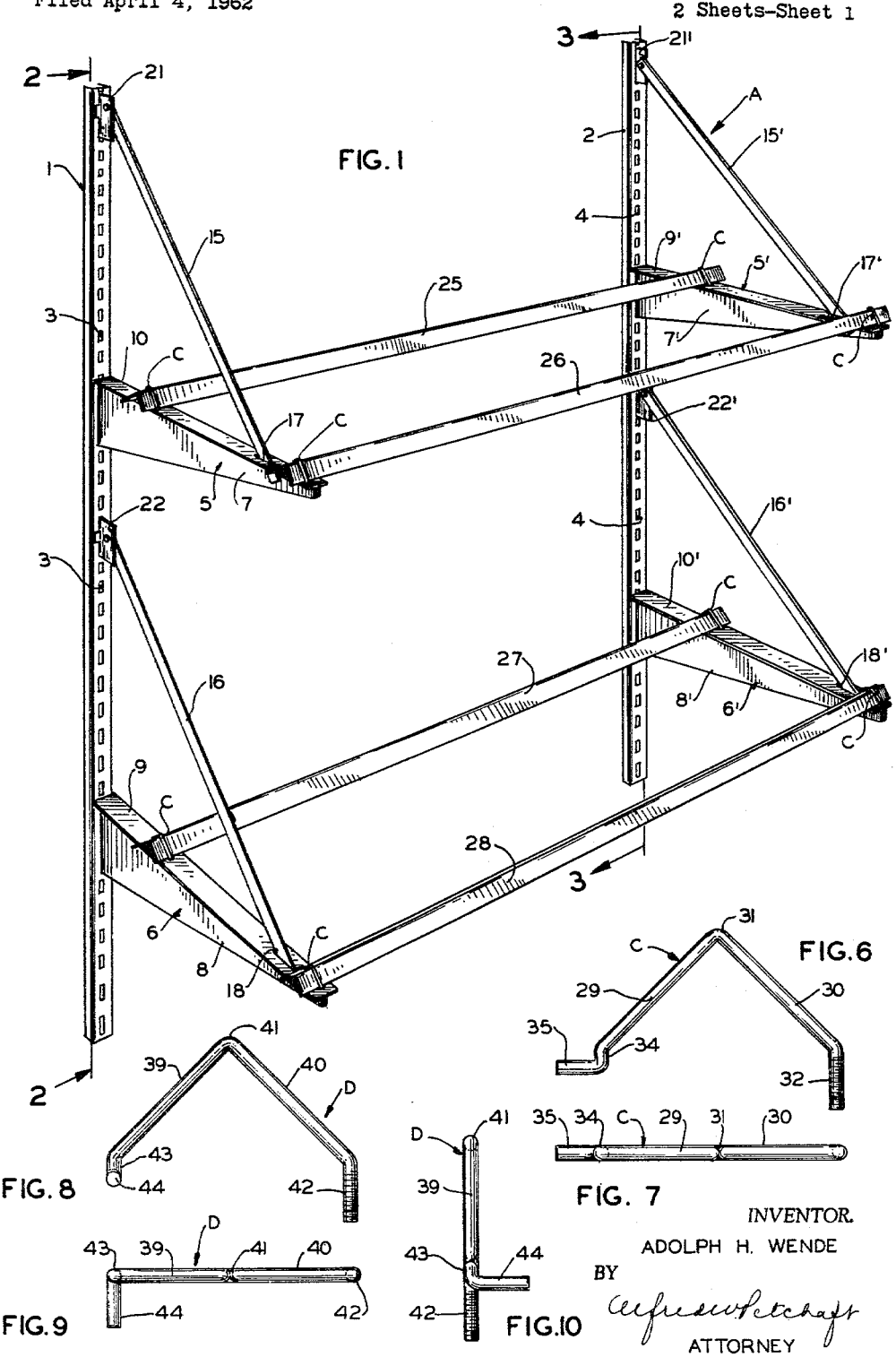

Referring now in more detail and by reference characters to the drawings, which illustrate practical embodiments of the present invention, A designates a tire display rack comprising a pair of spaced uprights 1, 2, preferably formed of any standard rolled U-shaped channel and which are provided on their forwardly presented faces (reference being made to FIG. 1) with pairs of slot-like apertures 3, 4, respectively. These slot-like apertures 3, 4, are arranged in uniformly spaced configuration along the centerlines of the lateral faces on which they are punched. The uprights 1, 2, can suitably be secured to a wall or other similar support by bolts or similar fastening means or a conventional floor-mounted base (not shown).

Secured to, and extending forwardly of, the upright 1 is a pair of vertically spaced tire support brackets 5, 6, and secured to, and extending forwardly of, the upright 2 is a pair of vertically spaced tire support brackets 5′, 6′, which are provided for cooperation with the brackets 5, 6, respectively. Each of the brackets 5, 6, includes vertical webs 7, 8, which integrally merge at their upper margins into horizontal support flanges 9, 10, respectively. The brackets 5, 6, are integrally provided on their rearwardly presented surfaces (reference being made to FIG. 1) with vertically spaced pairs of hooks 11, 12, respectively, including hook fingers 13, 14, which are adapted to extend through the aperture 3 formed within the upright 1, all as best seen in FIG. 2.

Each of the brackets 5′, 6′, are mirror images of the brackets 5, 6, and include vertical webs 7′, 8′, which merge at their upper margins into horizontal flanges 9′, 10′. The brackets 5′, 6′, are integrally provided with vertically spaced pairs of hooks 11′, 12′, respectively, including hook fingers 13′, 14′, which are adapted to extend through the slot-like aperture 4 of the upright 2, substantially as shown in FIG. 3.

The brackets 5, 6, are reinforced by struts 15, 16, which extend through apertures 17, 18, formed within the flanges 9, 10, and are bolted to the vertical webs 7, 8, by means of bolts 19, 20, respectively. The upper end of the struts 15, 16, are bolted to strut-brackets 21, 22, each of which integrally includes rearwardly extending vertically spaced hook fingers 23, 24, which are adapted to extend through the slot-like aperture 3 formed in the upright 1, substantially as shown in FIG. 2.

The brackets 5, 6, are similarly reinforced by means of struts 15′, 16′, which are mirror images of the struts 15, 16, the struts 15′, 16′, extending through apertures 17′, 18′, formed within the horizontal flanges 9′, 10′, and which are bolted to the vertical webs 7′, 8′, by means of bolts 19′, 20′. The upper ends of the struts 15′, 16′, are bolted to strut brackets 21′, 22′, each of which is integrally provided with a pair of rearwardly extending vertically spaced hook fingers 23′, 24′, which are adapted to extend through the slot-like aperture 4 formed within the upright 2, substantially as shown in FIG. 3.

Secured to, and extending between each of the brackets 5, 5′, is a pair of horizontally spaced tire supports 25, 26, preferably formed of any suitable rolled piece of angle iron. Extending between, and secured to, the flanges 10, 10′, of each of the lower uprights 6, 6′, are horizontally spaced tire supports 27, 28, all as best seen in FIG. 1.

In this connection, it is to be noted that the uprights 1, 2, can be provided with a number of rack assemblies for supporting tires and is not necessarily limited to two rack assemblies, substantially as shown in FIG. 1. It should also be noted in this connection that a number of the tire display racks A could be endwise connected to form a plural link of such display racks. Such arrangement would merely require use of tire supports similar to the supports 25, 26, 27, 28, of extended length which could be secured to each of the lengthwise aligned brackets similar to the brackets 5, 6.

Each of the supports 25, 26, 27, 28, are secured to the brackets 5, 6, 5′, 6′, by means of an attachment means or clamp C, substantially as shown in FIG. 6. The clamp C includes a pair of diverging legs 29, 30, which merge at a common apex 31, substantially forming a right angle. The leg 30 integrally merges into a downwardly extending shank 32 which is externally threaded for the accommodation of a standard nut 33. The leg 29 merges at its lower end into a downwardly extending portion 34 which, in turn, merges into a hook-arm 35. By reference to FIG. 7, it can be seen that the legs 29, 30, the shank 32, the vertical portion 34, and the hook-arm 35, all lie within the same vertical plane.

As each of the tire supports 25, 26, 27, 2, are formed of similar angle iron and each are secured to the brackets 5, 6, 5′, 6′, in the same manner, it will suffice to describe in detail the method of securement of any suitable piece of angle iron, such as the tire support 26 to the bracket 5′, substantially as shown in FIG. 5. The hook-arm 35 is inserted through an aperture 36 formed within the horizontal flange 9′ and the externally threaded shank 32 is inserted in an aperture 37 also formed in the flange 9'. As this is accomplished, the diverging legs 29, 30, engage each of the legs of the support 26. After the shank 32 is inserted through the aperture 37, a washer 38 is inserted around the shank and engages the under portion of the flange 9' and the entire clamp C is secured in its clamping position by means of the nut 33. As the nut 33 is tightened, the hook-arm 35 will engages the under side of the flange 9' and hold the clamp C rigidly in clamping position. Thus, by reference to FIGS. 2 and 3, it can be seen that each of the tire supports 25, 26, 27, 28, are secured to the brackets 5, 6, 5', 6', by means of the clamp C in the manner as previously described and the assembly thereof is very quick and simple.

It is possible to provide a modified form of attachment means or clamp D substantially as shown in FIGS. 8–10 and including a pair of outwardly diverging legs 39, 40, which meet at a common apex 41, substantially forming a right angle. The legs 39, 40, each lie within the same vertical plane, the leg 40 integrally merging into a downwardly extending shank 42 which is externally threaded for accommodation of any suitable nut such as the nut 33. The leg 9 merges into a downwardly extending portion 43 which is coplanar with the legs 39, 40, the downwardly extending portion 43 integrally merging into a hook-arm 44 which lies in a plane perpendicular to the vertical plane of the legs 39, 40, all as can best be seen in FIGS. 8 and 9. The clamp D is used in substantially the same manner as the clamp C where the hook-arm 44 is inserted through the aperture 36 and engages the underside of the flange 9'. The shank 42 is next inserted in the aperture 37 when the diverging legs 39, 40, engage the legs of the support 26. The clamp D is then secured in a clamping manner by means of any suitable nut such as the nut 33.

In use, the tire display rack A can be easily and rapidly assembled by securing the uprights 1, 2, to any suitable wall or similar support. The brackets 5, 6, are secured to the upright 1 in vertically spaced relation by inserting the hook fingers 13, 14, in the slot-like aperture 3 formed in the upright 1. Similarly, the brackets 5', 6', are secured to the upright 2 by inserting the hook fingers 13', 14', within each of the slot-like apertures 4 formed in the upright 2. The lower end of the struts 15, 16, are inserted through the apertures 17, 18, and secured to the webs 7, 8, by means of bolts 19, 20. The upper ends of the struts 15, 16, are then secured to the strut support brackets 21, 22, the hook-engaging fingers 23, 24, of which are inserted in the apertures 3. In like manner, the lower end of the struts 15', 16', are inserted through the apertures 17', 18', and secured to the webs 7', 8', by means of bolts 19', 20'. The upper ends of the struts 15', 16', are secured to the strut-support brackets 21', 22', the hook-engaging fingers 23', 24', of which are inserted in the aperture 4.

Finally, the tire supports 25, 26, 27, 28, are disposed upn the brackets 5, 5', 6, 6'. Each of these supports are secured to the respective brackets by use of the clamps C or D in the manner as shown in FIG. 5, and provides support which is particularly well suited for displaying annular objects such as tires while affording maximum strength at minimum cost in terms of the size and weight of the section used.

It, of course, should be understood that the sequence of assembly operations can be varied according to the convenience of the person doing the work. It is not essential that the above-described sequence of assembly be followed in a precise order as described.

It should be understood that changes and modifications in the form, construction, arrangement, and combination of the several parts of the display racks and method of assembling same may be made and substituted for those herein shown and described without departing from the nature and principle of my invention.

Having thus described my invention, what I claim and desire to secure by Letters Patent is:

1. A display rack for torus-shaped objects such as automobile tires and the like, said rack comprising a plurality of uprights lying in a common plane such as a vertical wall to which said uprights are adapted for spaced parallel attachment, each of said uprights having a plurality of spaced apertures, a plurality of brackets each provided at one of its ends with hook means engaged in any one of the apertures so that each bracket will extend outwardly from the upright to which it is attached, each of said brackets also including a top web and lengthwise extending and depending flange having a rearwardly presented abutment face engaged against the upright to which the bracket it attached, strut means for each bracket, each strut means being bolted at its lower end to the flange of the bracket for limited pivoted movement with respect thereto, a strut-bracket similarly secured to the upper end of the strut-means for limited pivoted movement with respect thereto, said strut-bracket being provided with hook means engaged in a selected aperture of the upright to which its associated bracket is attached whereby each bracket can be removably and adjustably mounted upon a selected one of the uprights, so as to be paired up in transverse alignment with a similar bracket on another upright, and a pair of longitudinal rails associated with such pair of transversely aligned brackets, means securing said rails upon the top webs of the brackets in spaced parallel relation so as to support the torus-shaped object in substantially upright position therebetween.

2. A display rack according to claim 1 in which the longitudinal rails have a cross-sectional shape substantially resembling an inverted V.

3. A display rack according to claim 1 in which the bar has the cross-sectional shape of an inverted V and the attachment means is a clamp securing the bar to the bracket, said clamp having a pair of divergent legs which are substantially perpendicular to each other, a threaded portion extending outwardly from one leg at an angle of approximately 45° with respect to said leg, and a said hook-arm including a leg portion integrally joined at one end to said last-named divergent leg and being substantially parallel to the threaded portion, said leg-portion also being integrally joined at its other end to a lateral portion which is substantially perpendicular to the leg-portion.

References Cited by the Examiner
UNITED STATES PATENTS

| | | | |
|---|---|---|---|
| 1,795,060 | 3/31 | Vance | 211—177 X |
| 1,865,298 | 6/32 | Beach | 211—23 |
| 2,262,794 | 11/41 | Burbank | 211—23 X |
| 2,622,541 | 12/52 | Smart | 211—148 |
| 2,767,950 | 10/56 | Bellon | 211—148 |
| 2,933,196 | 4/60 | Childs | 211—148 |

FOREIGN PATENTS 292,715  1953  Switzerland.

FRANK L. ABBOTT, *Primary Examiner.*

CLAUDE A. LE ROY, *Examiner.*